United States Patent [19]

Ey-Rang et al.

[11] Patent Number: 5,017,849

[45] Date of Patent: May 21, 1991

[54] DRIVING CONTROL CIRCUIT FOR ROBOT

[76] Inventors: An Ey-Rang, 168-14 Wonmidong, Joongku, Buchonsi, Kyungkido; Cho Jung-Whan, Mokdong New Town Apartment 1327-802, 328 shinjungdong, Yangchonku, Seoul, both of Rep. of Korea

[21] Appl. No.: 531,507

[22] Filed: May 31, 1990

[30] Foreign Application Priority Data

May 31, 1989 [KR] Rep. of Korea ............... 7440/1989
May 16, 1990 [KR] Rep. of Korea ............... 6999/1990

[51] Int. Cl.$^5$ .......................................... G05B 19/22
[52] U.S. Cl. ........................... 318/568.1; 318/568.13; 318/568.17; 318/574; 364/513; 414/730
[58] Field of Search ............................. 318/560-646; 364/513, 188, 189, 190; 901/3, 5, 8, 9, 12, 13, 16, 17, 18, 19, 20, 23; 414/730, 731, 732; 425/149, 150

[56] References Cited

U.S. PATENT DOCUMENTS

| | | | |
|---|---|---|---|
| 4,021,651 | 5/1977 | Mitsuhashi et al. | 364/188 X |
| 4,221,997 | 9/1980 | Flemming | 318/568.13 |
| 4,305,028 | 12/1981 | Kostas et al. | 318/571 X |
| 4,562,391 | 12/1985 | Inoue | 318/649 X |
| 4,604,561 | 8/1986 | Kamajima et al. | 318/561 X |
| 4,611,296 | 9/1986 | Niedermayr | 414/730 X |
| 4,625,285 | 11/1986 | Mori et al. | 318/568.17 X |
| 4,631,689 | 12/1986 | Arimura et al. | 364/513 |
| 4,661,032 | 4/1987 | Arai | 318/568.19 X |
| 4,706,001 | 11/1987 | Nakashima et al. | 318/565 X |
| 4,906,907 | 3/1990 | Tsuchihashi et al. | 318/574 X |

*Primary Examiner*—Paul Ip
*Attorney, Agent, or Firm*—Marshall & Melhorn

[57] ABSTRACT

A driving control circuit controls a robot in grasping a desired product positioned within an injection mould, safely moving the desired product to a predetermined place, and then returning the robot to its initial position. The circuit uses a plurality of relays, timers and sensors without the use of a computer system to mechanically operate the robot. The driving control circuit allows the robot to function using a general motor without the use of an expensive stepping motor standard in robotics. The elimination of the stepping motor reduces the manufacturing cost, thereby, improving industrial automation.

3 Claims, 8 Drawing Sheets

DRIVING CONTROL CIRCUIT FOR ROBOT

BACKGROUND OF THE INVENTION

The present invention relates to a driving control circuit for robot, and particularly, to a driving control circuit for robot which controls the robot so as to draw a desired product injected at injection moulding mould out of the injection mould and then moving it to a predetermined place and delivering it safely and thereafter returning to an original state.

Most of industrial robot which had been used in general has controlled the operation by utilizing computer system. Accordingly, the operating program of the computer system should be prepared in response to the process of operating the industrial robot, and in case when the operating process is required to change according to the removal of set up place of the industrial robot, the operating program of the computer system should also be changed, therefore there has been a very difficult problem.

And, in case when controlling the operation of the industrial robot by a computer system, when general servo motor and the like are used for the driving source of each arm, errors are arisen very much so that the operation can not be correctly controlled. Therefore, stepping motor which being very much correct in operation is used for the driving source of arm, but since the stepping motor is very much expensive, the manufacturing cost of the preduct becomes very high, therefore not only much economical burden may be given to an user requiring the industrial robot but also it has been a great hindrance factor for the industrial automation.

OBJECT AND SUMMARY OF THE INVENTION

Therefore, it is an object of the present invention to provide a driving control circuit for controlling the operation of robot mechanically which uses relays and timer as well as various sensors without using the computer system.

Another object of the present invention is to provide a driving control circuit which is made to be able to change simply the operating process of robot by the changing of the setting time of timer and setting locations of various sensors.

Still another object of the present invention is to provide a driving control circuit capable of correctly controlling the driving of arm of robot while general type motor of relatively cheaper than stepping motor.

According to the present invention having such objects as above, when a product is injected to an injection metal mould and than the metal mould is opened, start approaching sensor detects the opening of injection metal mould. And first arm is dropped down by driving the motor of first arm in normal direction according to the detected signal of start approaching sensor, and then detecting whether or not the dropping of first arm is finished.

When the finishing of dropping down of first arm is detected, normal directional driving of first arm motor stopped, and second arm is advanced by driving the second arm motor in normal direction, and while a hand provided at the end of second arm is advanced, detecting the finishing of advancing of second arm and whether or not the product comes in so as to be gripped within the hand. When the advancing of second arm is finished, the normal directional driving of second arm is stopped, and when the product comes in so as to be gripped within the hand, the product is rendered to grip by operating fingers provided to the hand, and when the gripping period of time of the product is elapsed, the second arm motor driven to rearward direction and the second arm is driven to advance to rearward, and detecting whether or not the rearward driving of the second arm is finished, and when the rearward driving is finished, stopping the rearward driving of the motor of second arm.

On the other hand, when a predetermined period of time is elapsed from the time that the dropping down of the first arm is finished to the time that the second arm is driven and the product is drawn out of the injection metal mould and then being returned to an original state, the motor of the first arm is driven to rearward and the first arm is lifted up, and when the lifting up of the first arm is finished, rearward driving of the first arm motor is stopped and the rotational arm motor is driven to normal direction whereby the rotational arm is rendered to rotate.

Thereafter, timer of first arm and second arm is driven from the rotating time of the rotational arm, and the first arm and second arm are driven according to the lapse of established time. Therefore, the first arm and second arm can be made to move the product in right angle or S-shape according to the established time of timer. When the product is moved to a predetermined place, said driving is stopped in the order of second arm, rotational arm and first arm, and after the gripped product is put down, in accordance with the established times of rotational arm, first arm and second arm are elapsed, being returned to the original state in the order of first arm, rotational arm and second arm. Therefore, the returning angles of the rotational arm, first arm and second arm can be controlled according to the setablished time, in the time of returning to the original state also.

BRIEF DESCRIPTION OF THE DRAWINGS

FIG. 3(A) to (F) are detailed circuit diagrams for showing a preferred embodiment of the driving control circuit of the present invention, in which

DETAILED DESCRIPTION OF THE INVENTION

Hereinafter, the driving control circuit of the present invention will be described in detail with reference to the accompanying drawings.

Figure 1:
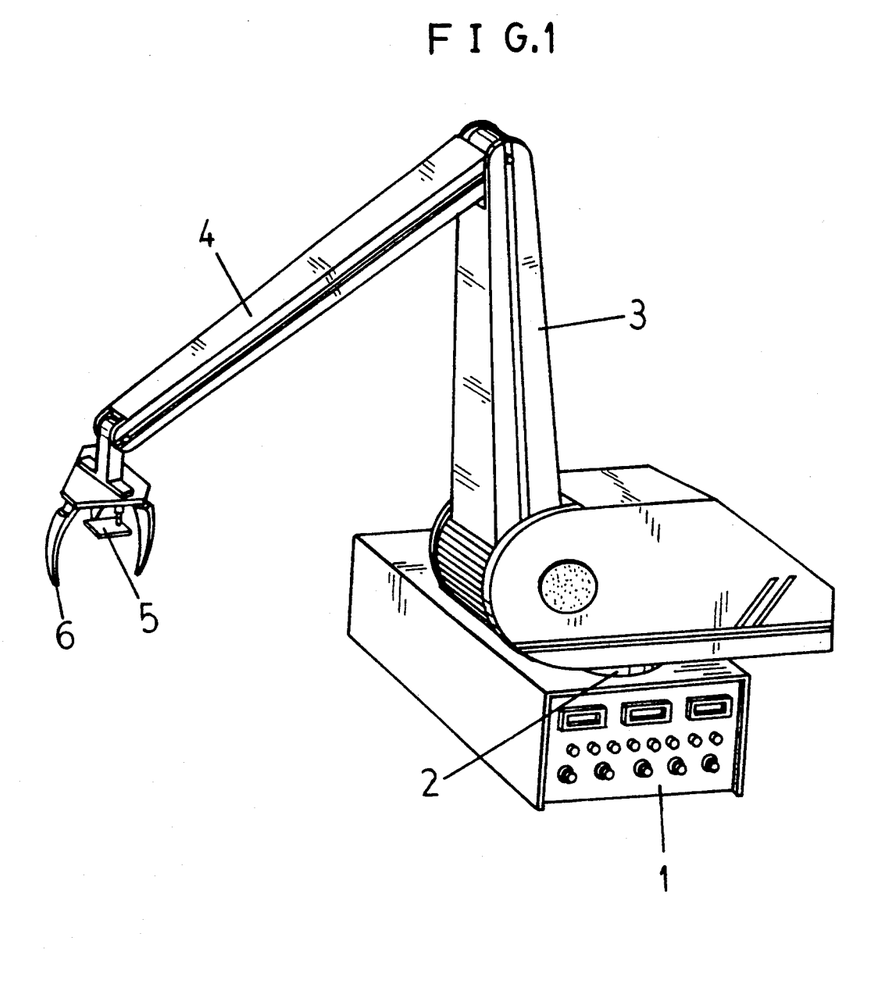
FIG. 1 is a schematic diagram for showing external appearance of robot driven by driving control circuit of the present invention.

FIG. 1 is a schematic diagrma for showing the external appearance of robot driven by the driving control circuit of the present invention. In the drawing, numeral symbol 1 represents main body of the robot. Rotational arm 2 is provided to the upper portion of the robot 1 and being made to be able to rotate to right and left. First arm 3 and second arm 4 are provided to connect in turn to the rotational arm 2, and hand 5 and fingers 6 are provided to the end of the second arm 4 so as to grip the product.

Figure 2:
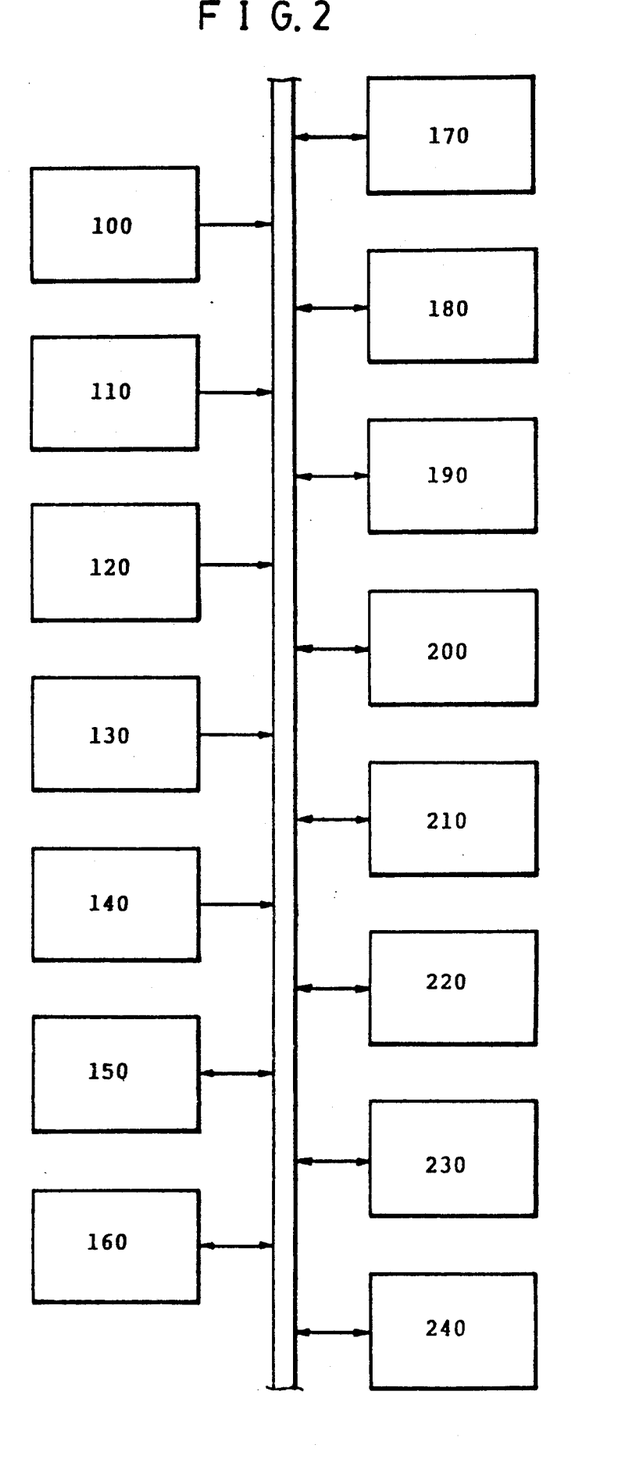
FIG. 2 is a block diagram for showing the driving control circuit of the present invention.

FIG. 2 is a block diagram for showing the driving control circuit of the present invention. The present invention is constituted with electric power required to the driving of the robot, starting means 110 for outputting the starting signal of the robot by detecting the opening of the injection metal mould, rotational arm sensor means 120 for detecting the finishing of rotation to right and left of the rotational arm 2, first arm sensor means 130 for detecting the finishing of operation of first arm 3 for the drawing and moving of the product, second arm sensor means 140 for detecting the finishing of operation of second arm 4 for the drawing and moving of the product, rotational arm driving means 150 for controlling the driving of the rotational arm 2 in the time of moving the product, driving means 160 for the product drawing of first arm for controlling the driving of first arm 3 in the time of drawing the product, driving means 170 for the product moving of first arm for controlling the driving of first arm in the time of moving the product, driving means 180 for the product drawing of second arm for controlling the driving of second arm 4 in the time of drawing the product, driving means 190 for the product moving of second arm for controlling the driving of second arm 4 in the time of moving the product, switching means 200 for the product drawing-/moving of second arm for switching the driving of second arm 4 in accordance with the drawing and moving of the product, second arm sensor switching means 210 for switching the signal of second arm sensor means 140 in accordance with the drawing and moving of the product, detecting means 220 for the product drawing-in for detecting whether or not the product comes into the hand 5 so as to grip, control means 230 for the product gripping for gripping the product by driving the fingers 6, and detecting and control means for the electric power failure/over load 240 for controlling the robot in the time of the electric power failure and over load so as to be returned to an original state.

And, FIGS. 3(A) to 3(F) are detailed circuit diagram for showing the preferred embodiments of each portion of FIG. 2, in which designations according to the operational function of each relay are as followings :

RY111 : starting relay.
RY121 : detecting relay for left rotation finishing of the rotational arm 2.
RY122 : detecting relay for original return finishing of the rotational arm 2.
RY131 : detecting relay for lift-up finishing of first arm 3.
RY132 : detecting relay for drop-down finishing of first arm 3.
RY151 : power suply relay of the rotational arm 2.
RY152 : driving relay of the rotational arm 2.
RY153 : driving direction switching relay of the rotational arm 2.
RY154 : auxiliary relay for the driving direction switching of the rotational arm 2.
RY155 : drive starting relay of the rotational arm 2.
RY156 : selectively driving relay for the right and left rotational timer of the rotational arm 2.
RY161 : driving direction switching relay of the first arm 3.
RY162 : driving relay of the first arm 3.
RY163 : auxiliary relay for the driving direction switching of the first arm 3.
RY171 : selectively driving relay for the timer of the first arm 3.
RY172 : setting relay for the lift-up driving time of the first arm 3.
RY173 : setting relay for the drop-down driving time of the first arm 3.
RY181 : driving relay in the time of drawing out the product of the second arm 4.
RY182 : braking relay in the time of drawing out the product of the second arm 4.
RY183 : switching relay for the driving direction in the time of drawing out the product of the second arm 4.
RY184 : auxiliary relay for the switching of driving direction in the time of drawing out the product of the second arm 4.
RY191 : auxiliary relay for the switching of driving direction in the time of moving the product of the second arm 4.
RY192 : switching relay for the driving direction in the time of moving the product of the second arm 4.
RY193 : power supply relay in the time of moving the product of the second arm 4.
RY194 : driving relay in the time of moving the product of the second arm 4.
RY201 : power supply switching relay in the time of drawing-out and moving the product of the second arm 4.
RY202 : braking relay in the time of drawing-out and moving the product of the second arm 4.
RY203 : selectively driving relay for drawing-out and moving the product of the second arm 4.
RY211 : selecting relay for the product drawing-out signal of the second arm 4.
RY212 : selecting relay for the product moving signal of the second arm 4.
RY221 : detecting relay for the product drawing-in.
RY231 : detecting relay for the product drawing-out.
RY232 : driving relay for the product drawing-out.
RY241 : over detecting relay of the rotational arm 2.
RY242 : over load detecting relay of the first arm 3.
RY243 : driving relay for the product moving of the second arm 4.
RY244 : relay for the warning and returning to original state in the time of electric power failure and over load.
RY245 : power supply relay for the warning and returning to original state in the time of electric power failure and over load.
RY246 : instantaneous cut out relay in the time of the electric power failure and over load.

In case when any of these relays is operated, the movable contacts of said switch is connected to a contact, and in case when it is not operated, being contacted to b contact.

Designations in accordance with the operational function of each timer are as followings:

T151: timer for delaying the returning to original state of the rotational arm 2.
T152: timer for delaying the product moving of the rotational arm 2.
T161: timer for delaying the drop-down in the time of drawing-out the product of the first arm 3.
T162: timer for delaying the lift-up in the time of drawing-out the product of the first arm 3.
T171: timer for delaying the driving in the time of moving the product of the first arm 3.
T172: timer for delaying the returning after moving the product of the first arm 3.
T181: timer for delaying the forward driving of the second arm 4.
T182: timer for delaying the rearward driving of the second arm 4.
T191: timer for establishing the product moving start of the second arm 4.
T192: timer for establishing the starting to return after the product moving of the second arm 4.
T241: timer for detecting the over load.
T242: timer for establishing the returning time in the time of electric power failure and over load.

Wherein, in the timers T191 and T242, when the driving time is started and the established time is elapsed, the contacts TS191 and TS242 of their timers contact respectively, and in the timers T152, T161, T162, T171, T172, T182, T192, and T241, when the driving is started and the established time is elapsed, the contacts TS151, TS152, TS161, TS162, TS171, TS172, TS181, TS182, and TS241 of their timers ar respectively opened.

And, the designations in accordance with the function of other important elements are as followings:
M1: driving motor for the rotational arm 2.
M2: driving motor for the first arm 3.
M3: driving motor for the second arm 4.
MB1: brake for the rotational arm 2.
MB2: brake for the first arm 3.
MB3: brake for the second arm 4.
PC121: photo-coupler for detecting the rotation finishing of the product moving of the rotational arm 2.
PC122: photo-coupler for detecting the return finishing of the rotational arm 2.
PC131: photo-coupler for detecting the lift-up finishing of the first arm 3.
PC132: photo-coupler for detecting the drop-down finishing of the first arm 3.
PC141: photo-coupler for detecting the return finishing of the second arm 4.
PC142: photo-coupler for detecting the drive finishing of the product drawing-out of the second arm 4.
PC143: photo-coupler for detecting the drive finishing of the product moving of the second arm 4.
PC241: photo-coupler for detecting the over load of the rotational arm 2.
PC242: photo-coupler for detecting the over load of the first arm 3.
SW: detecting switch to be opened in case when the product is drawn into the hand 5.
TR121; TR124, TR131; TR134, TR141; TR146: transistor
R121; R126, R131; R136, R141; R149, R241; R246: resistor
C101, C121, C122, C141; C143, C161, C181, C182, C191;
C196, C221, C241, C242: capacitor
D131, D132, D141, D142: diode
BD241, BD242: bridge diode
SL: solenoid for gripping the product.
SE; start approaching sensor that the switch SES is opened when the injection metal mould is opened.

The operation of the present invention having such constitution as above will be described in detail with reference to the accompanying drawings hereinafter.

Figure 3A:
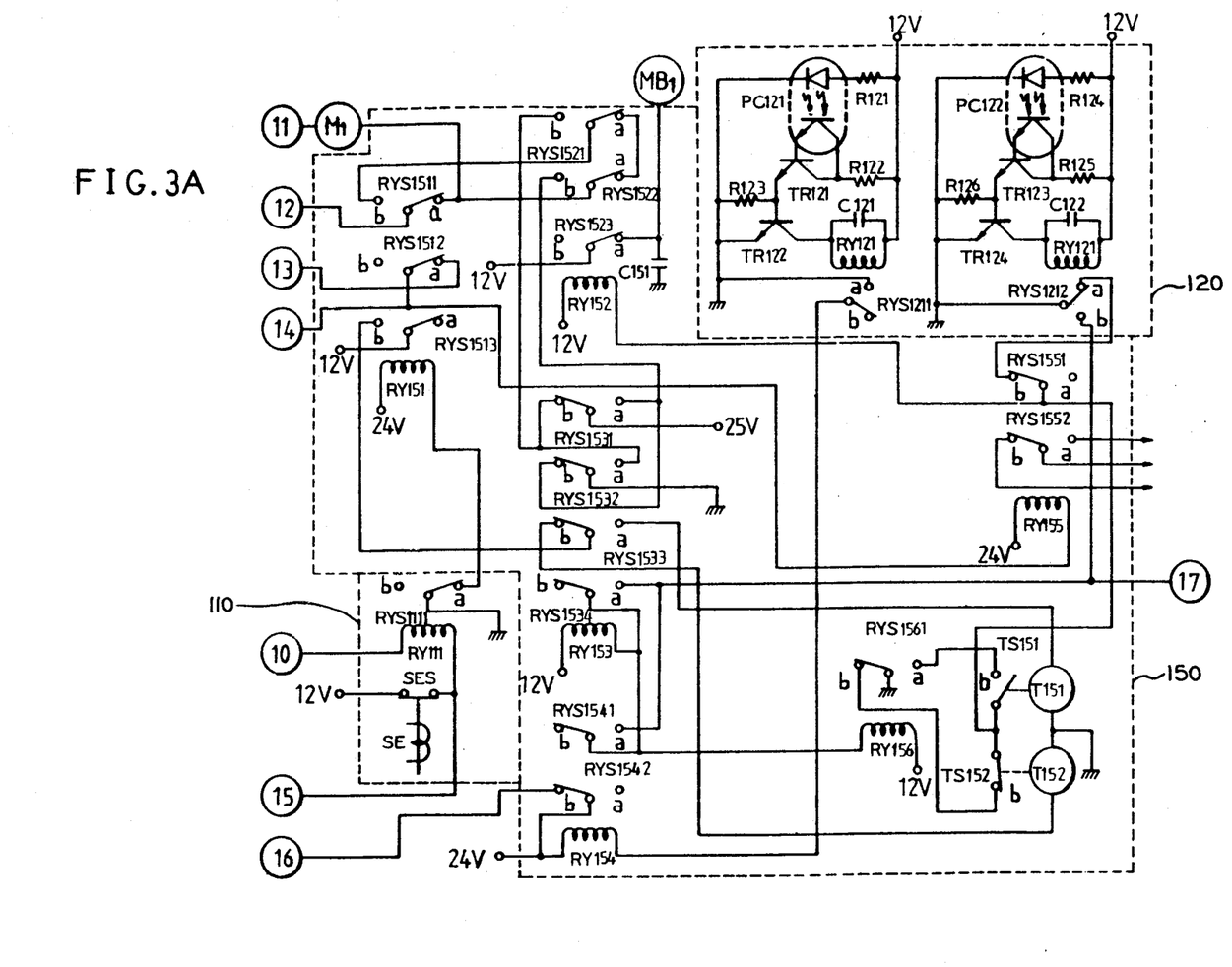
FIG. 3(A) shows a detailed circuit diagrma of starting means, rotational arm sensor means and rotational arm driving means.
Figure 3B:
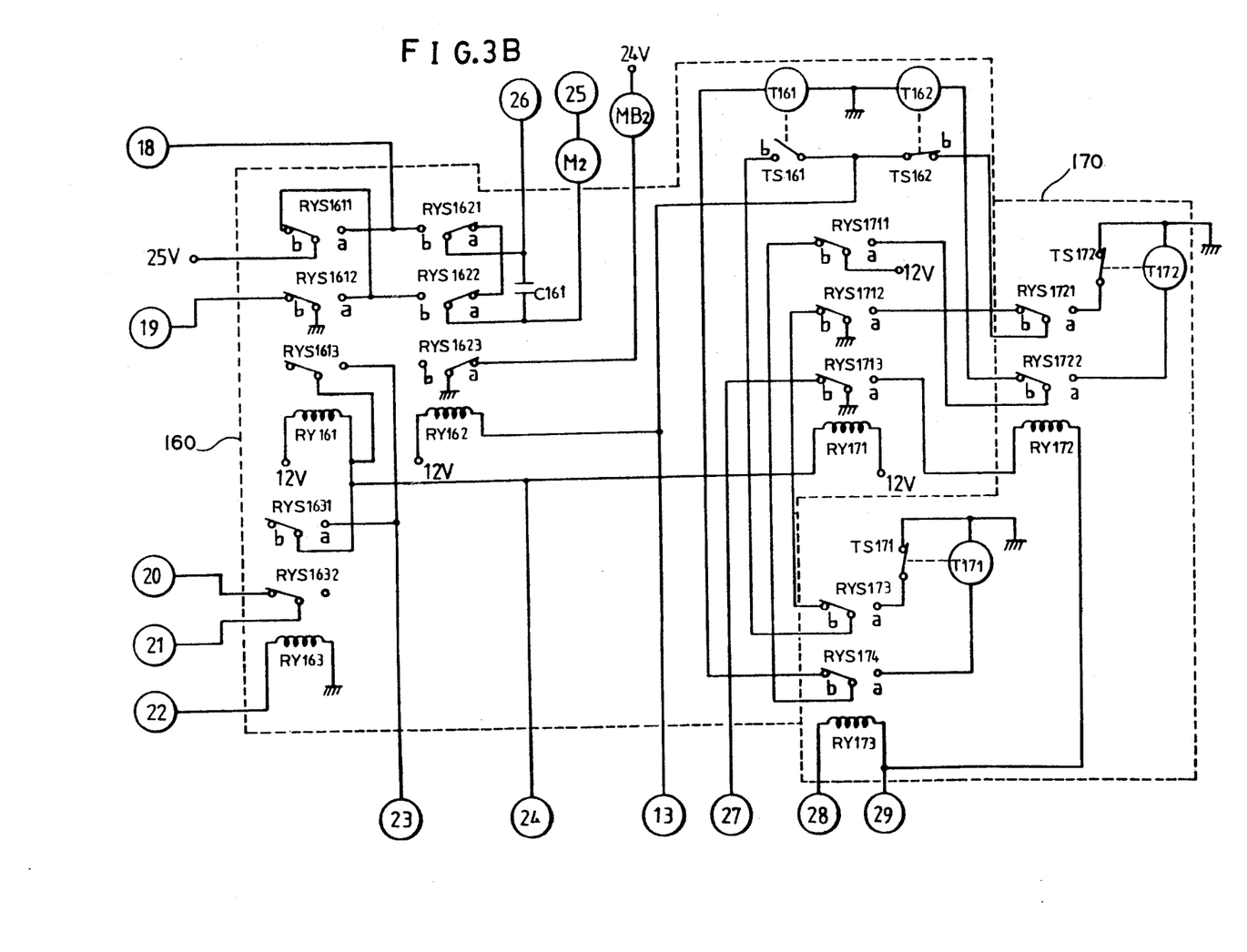
FIG. 3(B) shows a detailed circuit diagram of driving means for product drawing of first arm and driving means for product moving of first arm.
Figure 3C:
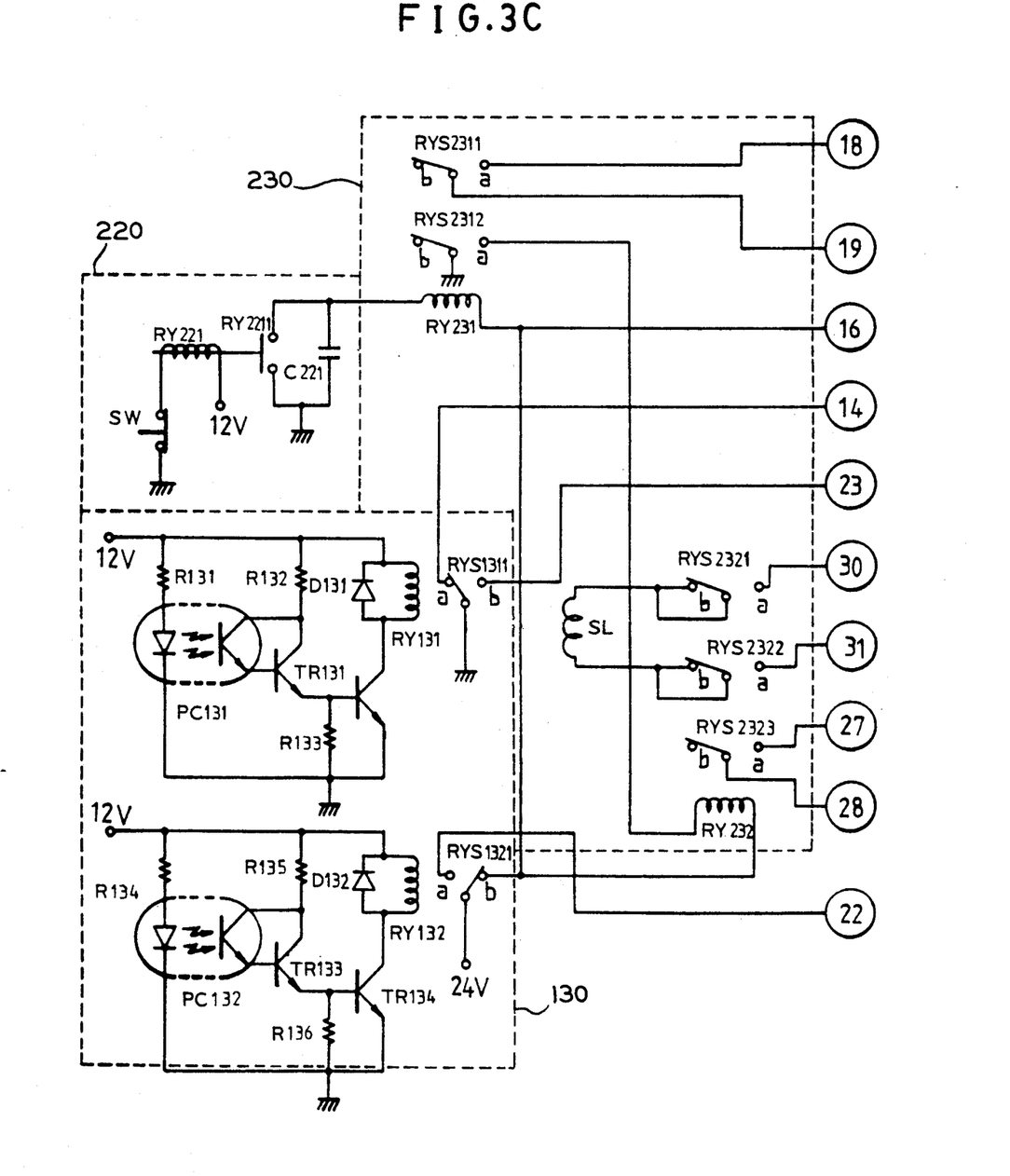
FIG. 3(C) shows a detailed circuit diagram of first arm sensor means, detecting means for product gripping and product drawing means.
Figure 3D:
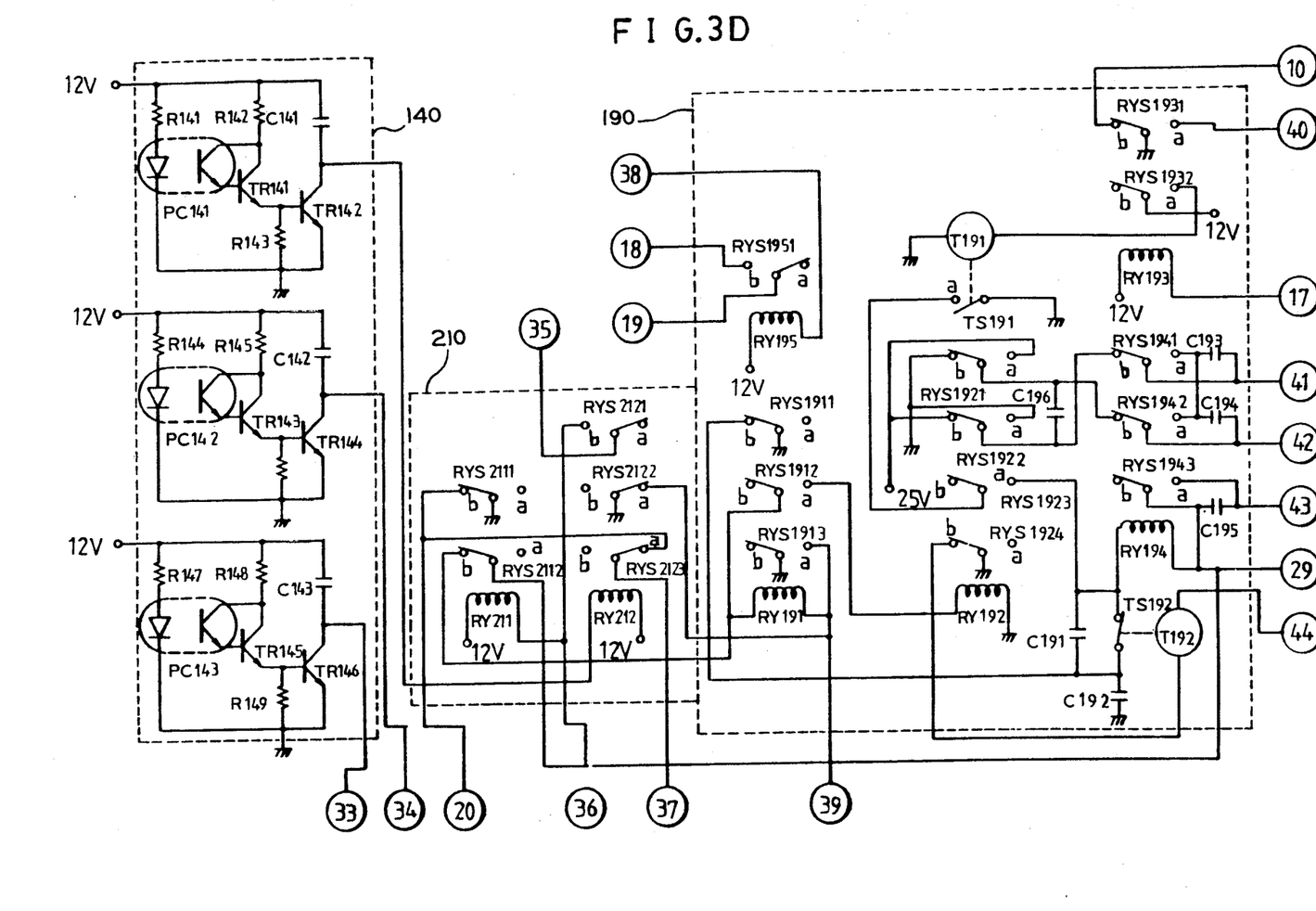
FIG. 3(D) shows a detailed circuit diagram of second arm sensor means, driving means for sensor selecting of second arm and driving means for product moving of second arm.
Figure 3E:
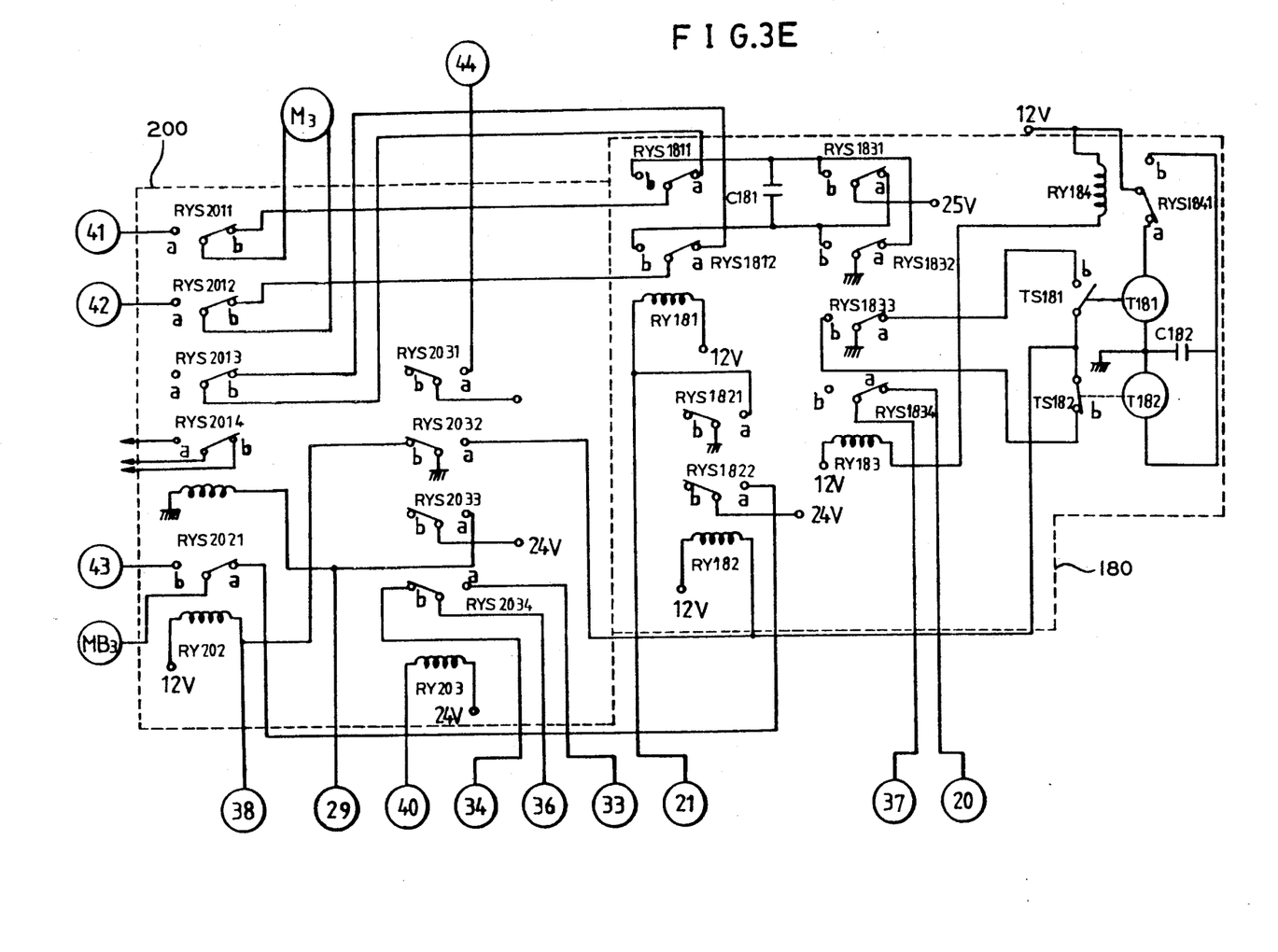
FIG. 3(E) shows a detailed circuit diagram of drive switching means for product drawing/moving of second arm an driving mean for product drawing of second arm.
Figure 3F:
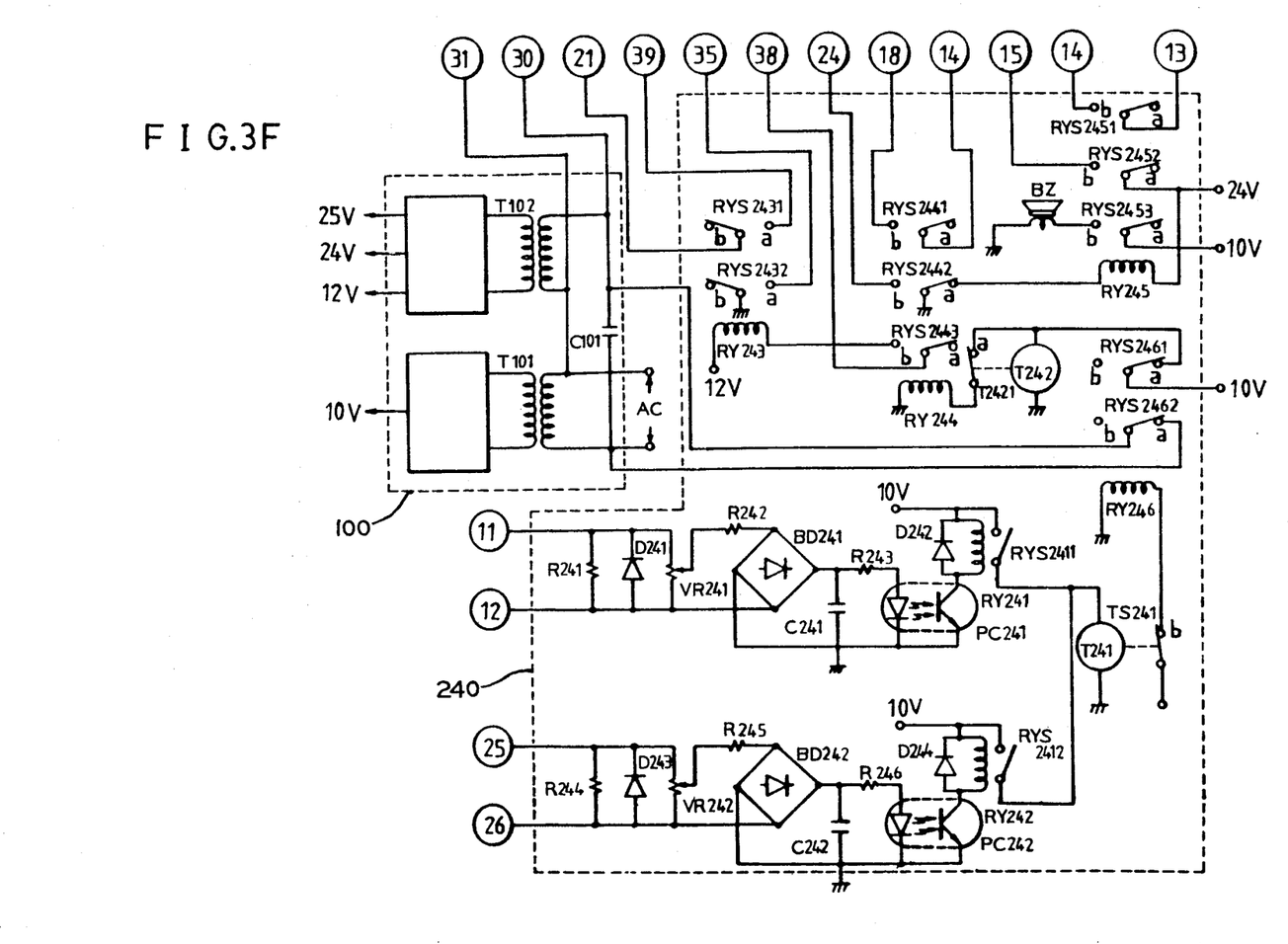
FIG. 3(F) shows a detailed circuit diagrma of detecting means of electric power failure/over load and electric power supply means.

When the alternating current AC is applied, the applied alternating current AC is inputted through the transformer T101 of the power supply means 100 to the first rectifier 101, and thereby the power supply of 10 V is outputted. Said outputted 10 V power supply is applied through the timer contact point TS241 to the relay RY246, whereby the relay RY246 is driven and the movable contacts of its switches RYS2461, RYS2462 are contacted respectively to the a contact points. Therefore, the alternating current power supply AC is inputted through the switch RYS2462 and transformer T102 to the second rectifier 102, whereby the second rectifier 102 outputs the main power supply of 12 V and 25 V.

At this time, since the relay RY245 is not yet driven, the power supply of 10 V is applied through the switch RYS2453 to the buzzer BZ and thereby the buzzer is driven and then starting to warn that the alternating current power supply AC is applied.

And, since the power supply of 10 V is applied through the switch RYS2461 to the timer T242 according to the movable contact point of switch RYS2461 contacting to the a contact point, the driving of the timer T242 is started. When the established time of the timer T242 (the rotational arm, first arm, and second arm are returned to the original position by the over load detecting circuit for about seventeen seconds) is elapsed and its switch TS242 is contacted, the relay RY244 is driven and thereby the movable contact points of the switches RYS2441-RYS2443 are contacted respectively to the a contact points. In accordance with the movable contact point of the switch RYS2442 contacting to the a contact point, the relay RY245 is driven and the movable contact points of its switches RYS2451-RYS2453 are contacted to the a contact points, whereby the driving of the buzzer BZ is stopped.

And, if it is assumed that presently the injection metal mould is not opened, the start approaching sensor SE is not driven, accordingly the power supply of 24 V is applied to the one terminal of the relay RY111, and another terminal of the relay RY111 is grounded through the switch RYS1931 of the relay RY193, therefore the relay RY111 is driven and thereby the movable contact point of the switch RYS1111 is contacted to the a contact point, and the relay RY151 is driven whereby the movable contact points of the switches RYS1511-RYS1513 are contacted to the a contact points.

And, the other terminal of the relay RY152 is grounded through the switch TS152 of the timer T152 and it is driven, and the movable contact points of the switches RYS1521-RYS1523 are respectively contacted to the a contact points, and the other terminal of the relay RY162 is grounded through the switch TS161, the switch RYS1731 of the relay RY173 and the switch RY1712 of the relay RY171 in turn and it is driven, and the movable contact points of the switches RYS1621-RYS1623 are contacted to the a contact points, and since the power supply of 12 V is applied through the switch RYS1711 of the relay RY171 and the switch RYS1732 of the relay RY173, the timer T161 is driven, the switch TS161 is opened in accordance with the established time of it being elapsed.

Further, at this moment, if it is assumed that the rotational arm 2, first arm 3 and second arm 4 of the robot are all in the initial position, since the photo-couplers PC122, PC131 and PC141 are all operated, the transistors TR123, TR124; TR131, TR132; TR141, TR142 become ON in turn, and the relays RY122 and RY131 are driven, whereby the movable contact points of the switches RYS1221, RYS1311 are contacted to the a contact points, at the same time, since the other terminal of the relay RY212 is grounded through the transistor TR142, the relay RY212 is driven and thereby the movable contact points of its switches RYS2121–RYS2123 are contacted to the a contact points.

Furthermore, since the other terminals of the relays RY195, RY202 are grounded and driven through the switch RYS2032 of the relay RY203, the movable contact points of the switches RYS1951, RYS2021 are contacted to the a contact points, and since the other terminal of the relay RY181 is grounded and driven through the switch RYS1632 of the relay RY163 and the switch RYS2111 of the relay RY211, the movable contact point of the switches RYS1811, RYS1812 are contacted to the a contact points, and since the other terminals of the relays RY183, RY184 are grounded and driven through the switch RYS2123 of the relay RY212 and the switch RYS2111 of the relay RY211, the movable contact points of the switches RYS1831–RYS1841 are contacted to the a contact points, and the timer T181 is driven according to the switch RYS1841 being contacted, and when the established time of said timer T181 is elapsed, said switch TS181 is opened.

When the product is injected at the injection metal mould in this initial state and the injection metal mould is opened whereby the start approaching sensor SE is driven, since the switch SES is opened and the driving of the relay RY111 is stopped and the movable contact point of the switch RYS1111 is contacted to the b contact point, the driving of the relay RY151 is stopped, and the movable contact points of the switches RYS1511–RYS1513 are contacted to the b contact points. Therefore, the power supply of 12 V is applied through the switch RYS1513 and the switch RYS1533 of the relay RY153 to the timer T152 whereby the driving of the timer T152 is started, and the driving of the relay RY162 is stopped according to the switching of the switch RYS1532 whereby the movable contact points of the switches RYS1621–RYS1623 are contacted to the b contact points.

Therefore, the driving of the brake MB2 of the first arm 3 is stopped, and the power supply of 25 V is applied to the one terminal of the motor M2 of the first arm 3 through the switches RYS1611, RYS1622 of the relays RY161, RY162 and the resistor R244, and since the other terminal of the motor M2 is grounded in turn through the switch RYS1621 of the relay RY162, the switch RYS2311 of the relay RY231 and the switch RYS1612 of the relay RY161, the motor M2 is driven in normal direction and thereby the first arm 3 is driven to drop-down so as to draw-out the product. And, since the driving of the photo-coupler PC131 is stopped according to the drop-down driving of the first arm 3, the transistors TR131, TR132 become OFF, and the driving of the relay RY131 is stopped and thereby the movable terminal of the relay switch RYS1311 is contacted to the b contact point.

In these state, when the drop-down of the first arm 3 is finished, the photo-coupler PC132 is operated whereby the transistors TR133, TR134 become ON, and the relay RY132 is driven, and since the movable contact point of the switch RYS 1321 is contacted to the a contact point, the power supply of 24 V is applied through the switch RYS1321 to the relay RY163 and it is driven, and thereby the movable contact points of the switches RYS1631, RYS1632 are contacted to the a contact points.

Therefore, the grounding of the relay RY181 is cut off according to the switching of the switch RYS1632 and its driving is stopped, and the other terminals of the relays RY161, RY171 are grounded and driven through the switches RYS1631, RYS1311 according to the switching of the switch RYS1631; and thereby the movable contact points of the switches RYS1611–RYS1613, RYS1711–RYS1713 are contacted to the a contact points. The power supply of 12 V is applied through the switches RYS1711, RYS1722 to the timer T162 according to the switching of the switch RYS1711 and thereby the driving of the timer T162 is started, and since the other terminal of the relay RY162 is grounded through the switches TS162, RYS1721, RYS1712 according to the switching of the switch RYS1712 before the established time of the timer T162 is elaped, the relay RY162 is driven and the driving of the motor M2 is stopped, and the brake MB2 is driven whereby the drop-down action of the first arm 3 is stopped.

Accordingly, the power supply of 25 V is applied through the switches RYS1831, RYS1812, RYS2012 to the motor M3, and since the other terminal of the motor M3 is grounded in turn through the switches RYS2011, RYS1811, RYS1832, the motor M3 is driven to the normal direction and thereby the second arm 4 becomes to execute the forward driving for the drawing-out of the product.

Thus, when the second arm 4 is driven to forward, since the driving of the photo-coupler PC141 is stopped and the transistors TR141, TR142 beocme OFF, the driving of the relay of the relay RY212 is stopped and thereby the movable contact points of the switches RYS2121–RYS2123 are contacted to the b contact points.

Therefore, while the grounding of the relays RY183, RY184 through the switch RYS2123 is cut off according to the switching of the switch RYS2123, since it is kept grounded through the switches RYS1834, RYS2111, the relays RY183, RY184 become to keep the driving state continuously.

In these state, when the forward driving of the second arm 4 is finished and the photo-coupler PC142 is operated, the transistors TR143, TR144 become ON, and since the other terminal of the relay RY211 is grounded through the switch RYS2034 and the transistor TR144, the relay RY211 is driven and thereby the movable contact points of the switches RYS2111, RY2112 are contacted to the a contact points. Therefore, the grounding of the relays RY183, RY184 are all cut off whereby the driving is stopped, and since the movable contact points of the switches RYS1831–RYS1834, RYS1841 are contacted to the b contact points, the driving of the timer T182 is started, and since the other terminal of the relay RY182 is grounded through the switch TS182 of the timer T182 and the switch RYS1833 before the established time of the timer T182 is elapsed, the relay RY182 is driven and thereby the movable contact points of the switches RYS1821, RYS1822 are contacted to the a contact points.

Accordingly, the power supply of 24 V is applied through the switch RYS2021 to the brake MB2 of the second arm 4 whereby the forward driving of the second arm 4 is stopped, and since the relay RY181 is grounded through the switch RYS1821 and it is driven, the movable contact points of the switches RYS1811, RYS1812 are contacted to the a contact points, and since both terminals of the motor M3 are interconnected through the switches RYS2011, RYS2013, RYS1812, RYS2012, the driving of the motor M3 is stopped.

Thus, when the forward driving of the second arm 4 is finished, and the product injected at the injection metal mould comes into the hand so as to be gripped and thereby the switch SW is opened, since the driving of the relay RY221 is stopped whereby the switch RYS2211 is contacted, the power supply of 24 V becomes flowed through the relay RY231 and the switch RY2211 whereby the relay RY231 is driven, and thereby the movable contact points of the switches RY2311, RY2312 are contacted to the a contact points, and relay RY232 is also switched according to the switching of the switch RYS2312 whereby the movable contact points of the switches RYS2321, RYS2323 are contacted to the a contact points. Therefore, since the alternating current AC power supply is applied through the switch RYS2462 and the switches RYS2321, RYS2322 to the solenoid SL, while the solenoid SL is driven, the fingers 6 provided to the hand 5 are shut whereby the product is gripped.

In these state, when the established time of thus driven timer T182 is elapsed, and its switch TS182 is opened, since the ground line of the relay RY182 is cut off whereby the driving is stopped, and the driving of the brake MB3 is stopped according to the switching of the switches RYS1822, and the driving of the relay RY181 is stopped according to the switching of the switch RYS1821 and thereby the movable contact points of the switches RYS1811, RYS1812 are contacted to the b contact points.

At this moment, since the relays RY183, RY201 are all in a state of driving stopped as above description, the power supply of 25 V is applied through the switches RYS1831, RYS1811, and RYS2011 to the other terminal of the motor M3, and since the one terminal of the motor M3 is grounded through the switches RYS2012, RYS1812, RYS1832, the motor M3 is driven to reverse direction contrary to the above description whereby the second arm 4 is made to be driven to rearward, and the operation of the photo-coupler PC142 is stopped according to the rearward driving of the transistor TR143, and thereby the transistors TR143, TR144 become OFF, and the driving of the relay RY211 is stopped whereby the movable contact points of the switches RY2111, RYS2112 are contacted to the b contact points.

Thus, when the rearward driving of the second arm 4 is finished and the photo-coupler PC141 is operated whereby the transistors TR141, TR142 become ON, since the relays RY183, RY184 are grounded and driven through the switches RYS2123, RYS2111 according to the switching of the switch RYS2123, the movable contact points of the switches RYS1831 - RYS1834, RYS1841 are contacted to the a contact points and thereby the driving of the timer T181 is started. And, since the relay RY182 is grounded and driven through the switches TS181, RYS1833 before the established time of the timer T181 is elapsed, the movable contact points of the switches RYS1821, RYS1822 are contacted to the a contact points, and thereby the power supply of 24 V is applied through the switches RYS1822, RYS2021 to the brake MB3 whereby the rearward driving of the second arm 4 is stopped, and the relay RY181 is driven according to the switching of the switch RYS1821 whereby the driving of the motor M3 is stopped.

In these state, when the established time of the timer T162 which has been driven as above description is elapsed whereby the switch TS162 is opened, since the driving of the relay RY162 is stopped whereby the movable contact points of the switches RYS1621-RYS1623 are contacted to the b contact points, the driving of the brake MB2 of the first arm 3 is stopped, at this moment, since the relay RY161 is in a normal driving state, the power supply of 25 V is flowed through the switches RYS1611, RYS1621, resistor R244, motor M2 and the switches RYS1622, RYS1612, therefore, the motor M2 is driven to reverse direction contrary to the above description whereby the first arm 3 is rendered to be driven to lift-up.

Thus, when the first arm 3 is driven to lift-up, since the operation of the photo-coupler PC132 is stopped whereby the transistors TR133, TR134 become OFF and the driving of the relay RY132 is stopped whereby the movable contact point of the switch RYS1321 is contacted to the b contact point, the driving of the relay RY163 is stopped whereby the movable contact points of the switches RYS1631, RYS1632 are contacted to the b contact points, and since the other terminal of the relay RY181 is grounded in turn through the switches RYS1632, RYS1834, RYS2123, and RYS2111 according to the switching of the switch RYS 1632, the relay RY181 is driven.

In these state, when the lift-up driving of the first arm 3 is finished whereby the photo-coupler PC131 is operated and the transistors TR131, TR132 become ON, since the relay RY131 is driven whereby the movable contact point of the switch RYS1311 is contacted to the a contact point, the grounding of the relays RY161, RY171 are cut off whereby their driving are stopped, and the movable contact points of the switches RYS1611-RYS1613, RYS1711-RYS1713 are contacted to the b contact points, and the relay RY155 is grounded and driven through the switch RYS1311, and thereby the movable contact points of the switches RYS1551, RYS1522 are contacted to the a contact points. Therefore, the power supply of 12 V is applied through the switches RYS1711, RYS1732 to the timer T161 whereby they are started to be driven according to the switching of the switch RYS1711, and since the other terminal of the relay RY162 is grounded and driven through the switches TS161, RYS1731, RYS1712 before the established time of the timer T161 is elapsed whereby the movable contact points of the switches RYS1621-RYS1623 are contacted to the a contact points, the brake MB2 is driven, and the motor M2 is stopped to drive whereby the lift-up operation of the first arm 3 is stopped.

And, since the relay RY155 is driven whereby the switch RY1551 is switched and accordingly the grounding of the relay RY152 is cut off whereby the driving is stopped, the movable contact points of the switches RYS1521-RYS1523 are contacted to the b contact points whereby the operation of the brake MB1 of the rotational arm 2 is stopped. At this moment, since the relay RY151 is driven as described in above whereby the movable contact points of the switches RYS1511-RYS1513 are contacted to the b contact points, the power supply of 25 V is flowed through the switches RYS1531, RYS1511, resistor R241, motor M1 of the rotational arm 2 and the switches RYS1522, RYS1532 whereby the motor M1 is driven to the normal direction, and thereby the rotational arm 2 is rendered to rotate in normal direction.

Thus, when the rotational arm 2 is driven to normal direction, the operation of the photo-coupler PC122 is stopped whereby the transistors TR123, TR124 become OFF, and since the driving of the relay RY122 is stopped whereby the movable contact point of the switch RYS1221 is contacted to the b contact point, the relay RY193 is driven whereby the movable contact points of the switches RYS1931, RYS1932 are contacted to the a contact points, and the driving of the relay RY111 is stopped according to the switching of the switch RYS1931, and the driving of the timer T191 is started according to the switching of the switch RYS1932.

Also, the relay RY203 is driven according to the switching of the switch RYS1931 whereby the movable contact points of the switches RYS2021-RYS2034 are contacted to the a contact points. Therefore, the power supply of 12 V is applied to the timer T192 according to the switching of the switch RYS2031 whereby it starts to be driven, and the driving of the relay RY202 is stopped according to the switching of the switch RYS2032 at the same time the relay RY182 is driven whereby the movable contact points of the switches RYS1821, RYS1822 are contacted to the a contact points and the relay RY181 is driven, and thereby the detecting signal of the photocoupler PC142 is cut off according to the switching of the switch RYS2034.

And, the power supply of 24 V is applied through the switch RYS2033 to the relays RY172, RY173, RY194, RY201 according to the switching of the switch RYS2033 as well as being applied through the switch RYS2112 again to the relay RY191. At this moment, since the relay RY232 is in a state of the driving, the other terminal of the relay RY172 is not grounded whereby it is not driven, and the other terminal of the relay RY173 is grounded and driven through the switches RYS1732, RYS1713, and the movable terminals of the switches RYS1731, RYS1732 are contacted to the a contact points, while the relay RY201 is driven and the movable contact points of the switches RYS20-11-RYS2014 are contacted to the a contact points, the driving signal of the injection metal mould is outputted whereby the injection metal mould becomes to start to inject the product again, at the same time, the polarity of the power supply to be applied to the motor M3 of the second arm 4 is changed, and the other terminal of the relay RY191 is grounded and driven through the switch RYS2122 whereby the movable contact points of the switches RYS1911-RYS1913 are contacted to the a contact points.

Then, the grounding of the relay RY194 is cut off according to the switching of the switch RYS1911 whereby being not driven, and the power supply of 24 V is applied through the switches RYS2033, RYS2112, RYS1912 to the relay RY192 according to the switching of the switch RYS1912 whereby the relay RY192 is driven, and the movable contact points of the switches RYS1921-RYS1924 are contacted to the a contact points.

Thus, the relay RY194 is not driven, the driving of the brake MB3 of the second arm 4 is stopped, and the power supply of 24 V is applied through the switches RYS1921, RYS1942, RYS2012 to the one terminal of the motor M3, and since the other terminal of the motor M3 is grounded through the switches RYS2011, RYS1941, RYS 1922, the motor M3 is driven to normal direction whereby the second arm 4 is driven to move the product, that is, the second arm 4 starts to be spread.

Thus, when the motor M3 is driven, since the operation of the photo-coupler PC141 is stopped whereby the transistors TR141, TR142 become OFF, the driving of the relay RY212 is stopped whereby the movable contact points of the switches RYS2121-RYS2123 are contacted to the a contact points. Therefore, the driving of the relays RY183, RY184 is stopped according to the switching of the switch RYS2123, and the relay RY191 makes own contact point through the switch RYS1913 whereby the driving state is kept maintained continuously irrespective of the switching of the switch RYS2122.

In these state, in case when the relay RY173 is driven as above description, if the established time of the timer T171 is elapsed which the power supply of 12 V is applied and driven through the switches RYS1711, RYS1732 and thereby the switch TS171 is opened, since the grounding line of the relay RY162 which has been passed through the switches TS161, RYS1731, TS171 is cut off, the driving of the relay RY162 is stopped, and the movable contact points of the switches RYS16-21-RYS1623 are contacted to the b contact points.

Accordingly, the driving of the brake MB2 of the first arm 4 is stopped, at this moment, since the relay RY161 is in a state of the driving stopped, the power supply of 25 V becomes flowed through the switches RYS1611 RYS1622, the motor M2, the resistor R244, and switches RYS1621, RYS2311, RYS1612 whereby the motor M2 is driven to the normal direction for the product moving, and the first arm 3 becomes spread.

That is, according to the present invention, in case of moving the product, the rotational arm 2 is driven at first, and sucessively the second arm 4 is driven, and after the established time of the timer T171 is elapsed, the first arm 3 is driven. Therefore, in accordance with the established time of the timer T171, after the driving of the second arm 4 is finished, while the driving of the first arm 3 is started, the first arm 3 and the second arm 4 form the right angle whereby the product can be moved, and the first arm 3 is driven immediately after the second arm 4 is driven whereby the product can be moved diagonally each other, and the driving of the first arm 3 is started after a predetermined period of time that the second arm 4 being driven is elapsed whereby the product can be moved in "S" shape.

Thus, when the motor M2 is driven, the operation of the photo-coupler PC131 is stopped whereby the transistors TR131, TR132 become OFF, and since the driving of the relay RY131 is stopped and the movable contact point of the switch RYS1311 is contacted to the b contact point, the driving of the relay RY155 is stopped.

And, when the established time of the timer which has been driven as in the above description is elapsed, its switch TS191 is connected, and when the driving of the second arm 4 is finished, the photo-coupler PC143 operates whereby the transistors TR145, TR146 become ON, at this moment, the relay RY203 is driven as above description and the movable contact point of the switch RYS2034 is contacted to the a contact point, therefore the other terminal of the relay RY21 is grounded through the switch RYS2034 and the transistor TR146 whereby it is driven, and the movable contact points of the witches RYS2111, RYS2112 are contacted to the a contact points.

Therefore, the driving of the relays RY183, RY184 is stopped according to the switching of the switch RY2111, and the power supply which has been applied to the relays RY191. RY192 is cut off according to the switching of the switch RYS2112 whereby the driving of the relays RY191, RY192 are stopped, and the movable contact points of the switches RYS1911-RYS1913, RYS1921-RYS1924 are contacted to the b contact points.

Thus, when the driving of the relays RY191, RY192 is stopped, the timer T192 is driven, and the other terminal of the relay RY194 is grounded through the switches TS192, RYS1911 and it is driven before the established time of the timer T192 is elapsed, and since the movable contact points of the switches RYS1941-RYS1943 are contacted to the a contact points, the both terminals of the motor M3 of the second arm 4 are contacted each other through the switches RYS2011, RYS2012, RYS1941, RYS1942 whereby the driving of the motor M3 is rapidly stopped.

In these state, when the rotation of the rotational arm 2 is finished whereby the photo-coupler PC121 is operated, and the transistors TR121, TR122 become ON, and the relay RY121 is driven whereby the movable contact point of the switch RYS1211 is contacted to the a contact point, the relay RY154 is driven whereby the movable contact points of the switches RYS1541, RYS1542 are contacted to the a contact points, at this moment, since the movable contact point of the switch RYS1221 of the relay RY122 is contacted to the a contact point, the other terminals of the relays RY153, RY156 are grounded through the switches RYS1541, RYS1221 according to the switching of the switch RYS1541 and they are driven, and the movable contact points of the switches RYS1531-RYS1543, RYS1561 are contacted to the a contact points, and while the power supply of the relays RY231, RY232 through said switch RYS1542 is cut off according to the switching of the switch RYS1542, but at this moment, the movable contact point of the switch RYS1321 is contacted to the b contact point whereby the relays RY231, RY232 maintains sucessively the driving state.

Thus, when the relay RY153 is driven, the polarity of the power supply to be applied to the motor M1 of the rotational arm 2 is previously changed according to the switching of the switches RYS1531, RYS1532, and the driving of the timer T152 is started according to the switching of the switch RYS1533, and the driving of the timer T151 is stopped whereby its switch TS151 is connected, and the other terminal of the relay RY152 is grounded through the switches TS151, RYS1561, therefore, the relay RY152 is driven whereby the movable contact points of the switches RYS1521-RYS1523 are contacted to the a contact points, and the relay RY153 makes own contact point state through the switches RYS1534, RYS1221 according to the switching of the switch RYS1534.

Thus, when the relay RY152 is driven, the driving of the motor M1 of the rotational arm 2 is stopped according to the switching of the switches RYS1521, RYS1522, and the brake MB1 is driven according to the switching of the switch RYS1523 whereby the rotation of the rotational arm 2 is stopped.

In these state, when the driving of the first arm 3 is finished whereby the photo-coupler PC132 is operated, and the transistors TR133, TR134 become ON, and the relay RY132 is driven whereby the movable contact point of the switch RYS1321 is contacted to the a contact point, the power supply to the relays RY231, RY232 is cut off whereby they are stopped to drive, and thereby the movable contact points of the switches RYS2311, RYS2312, RYS2321-RYS2323 are contacted to the b contact points, at the same time, the power supply is supplied to the relay RY163 whereby it is driven, and thereby the movable contact points of the switches RY1631, RY1632 are contacted to the a contact points.

Therefore, the driving of the solenoid SL is stopped according to the switching of the switches RYS 2321, RYS2323 whereby the fingers 6 are spread, and thereby the product which has been gripped by the hand 5 becomes released, and the grounding of the relay RY173 is cut off according to the switching of the switch RYS2323 whereby its driving is stopped, and the movable contact points of the switches RYS1731, RYS1732 are contacted to the b contact points.

And, at this moment, since the movable contact point of the switch RYS1311 is contacted to the b contact point, the other terminals of the relays RY161, RY171 are grounded through the switches RYS1631, RYS1311 according to the switching of the switch RYS1631 whereby the relays RY161, RY171 are driven, and the movable contact points of the switches RYS1611-RYS1613, RYS1711-RYS1713 are contacted to the a contact points. The polarity of the power supply to be applied to the motor of the first arm 3 is changed according to the switching of the switches RYS1611 RYS1612, and the relay RY161 makes own contact point according to the switching of the switch RYS1613 whereby the driving state is kept maintained successively. The relay RY172 is driven according to the switching of the switch RYS1713 whereby the movable contact points of the switches RYS1721, RYS1722 are contacted to the a contact points, and the power supply to be applied to the timer T161 is cut off according to the switching of the switch RYS1711 whereby its operation is stopped.

And, the driving of the timer T162 is stopped according to the switching of the switch RYS1722 whereby the switch TS162 is connected, and the driving of the timer T172 is started, and since the switch TS172 maintains continuously the connected state before the established time of the timer T172 is elapsed, the other terminal of the relay RY162 is grounded through the switches TS162, RYS1721, TS172 whereby the relay RY162 is driven.

Therefore, the movable contact points of the switches RYS1621-RYS1623 are contacted to the a contact points whereby the driving of the motor M2 of the first arm 3 is stopped, and the brake MB2 is driven whereby the driving of the first arm 3 is stopped.

That is, according to the present invention, in case when the moving of the product is finished, the photo-couplers PC143, PC121, PC132 detect the finishing of the driving of the second arm 4, the rotational arm 2 and the first arm 3, and thereby in turn the drivings are stopped, and the product which has been gripped is released. Therefore, the position to move the product is able to change by controlling the mounting locations of the photo-couplers PC143, PC121, PC132.

In these state, when the established time of the timer T172 is elapsed whereby the switch TS172 is opened, the driving of the relay RY162 is stopped, and the movable contact points of the switches RYS1621-RYS1623 are contacted to the b contact points whereby the driving of the brake MB2 is stopped, at this moment, since the relay RY161 is driven as aforementioned, the power supply of 25 V is flowed through the switches RYS1611, RYS1621, the resistor R244, the motor M2 and the switches RYS1622, RYS1612 whereby the motor M2 is driven to the reverse direction, and the first arm 3 is rendered to lift-up.

Thus, when the first arm 3 is lifted up, the operation of the photo-couple PC132 is stopped whereby the transistors TR133, TR134 become OFF, and the driving of the relay RY132 is stopped, and the movable contact point of the switch RYS1321 is contacted to the b contact point, therefore, the power supply is supplied to the relays RY231, RY232, but at this moment, the product gripped as aforementioned is released, accordingly the switch SW is connected, and the relay RY221 is driven, and the switch RYS2211 is opened whereby the relays RY231, RY232 are not driven, and the driving of the relay RY163 is stopped. Therefore, the movable contact points of the switches RYS1631, RYS1632 are contacted to the b contact points, and the other movable contact points of the switches RYS1631, RYS1632 are contacted to the b contact points, and the other terminal of the relay RY181 is grounded through the switches RYS1632, RYS1834, RYS2123, RYS2111 whereby it is driven, and the movable contact points of the switches RYS1811, RYS1812 are contacted to the a contact points, and thereby the grounding line of the relays RY161, RY171 through the switch RYS1631 is cut off.

And, when the established time of the timer T151 is elapsed whereby the switch TS151 is opened, since the driving of the relay RY152 is stopped whereby the movable contact points of the switches RYS1521-RYS1523 are contacted to the b contact points, the driving of the brake MB1 is stopped, at this moment, since the relay RY153 is in a state of the driving and the relay RY151 is in a state of the driving stopped, the power supply of 25 V is flowed through the switches RYS1531, RYS1522, the motor M1, the resistor R241, and the switches RYS1511, RYS1521, RYS1532 whereby the motor M1 is driven to the reverse direction, and the rotational arm 2 is made to start to return to the original state.

Thus, when the rotational arm 2 is rotated, the operation of the photo-coupler PC121 is stopped, and since the movable contact point of the switch RYS1211 is contacted to the b contact point, the driving of the relay RY154 is stopped. Therefore, the movable contact points of the switches RYS1541, RYS1542 are contacted to the b contact points whereby the grounding lines of the relays RY153, RY154 through the switch RYS1541 are cut off.

In these state, when the established time of the timer T192 is elapsed whereby the switch TS192 is opened, the driving of the relay RY194 is stopped whereby the movable contact points of the switches RYS1941 RYS1941-RYS1943 are contacted to the b contact points, at this moment, as aforementioned, since the relay RY192 is in a state of the driving stopped and the relay RY201 is in a state of the driving, the power supply of 25 V is flowed through the switches RYS1922, RYS1941, RYS2011, the motor M3, the switches RYS2012, and RYS1942, RYS1921, and thereby the motor M3 is driven to the reverse direction whereby the second arm 4 becomes folded.

Thus, when the second arm 4 is driven, the operation of the photo-coupler PC143 is stopped whereby the transistors become OFF, and the driving of the relay RY211 is stopped whereby the movable contact points of the switches RYS2111, RYS2112 are contacted to the b contact points.

That is, according to the present invention, in case when the moving of the product is finished, while the established times of the timers T172, T153, T192 are sequentially elapsed whereby the first arm 3, the rotational arm 2 and the second arm 4 are driven so that starting to return to the original state.

Therefore, the angles of the returning to the original state of the rotational arm 2, the first arm 3 and the second arm 4 can be controlled by the established times of the timers T172, T153, T192.

In these state, when the returning to the original state of the second arm 4 is finished whereby the photo-coupler PC141 is operated and the transistors TR141, TR142 become ON, the relay RY212 is driven, and the movable contact points of the switches RYS2121-RYS2123 are contacted to the b contact points. At this moment, since the movable contact point of the switch RYS2111 is contacted to the b contact point as aforementioned, the other terminals of the relays RY183, RY184 are grounded through the switches RYS2133, RYS2111 according to the switching of the switch RYS2123 whereby the relays RY183, RY184 are driven, and the relay RY184 is driven according to the switching of the switch RYS2122 whereby the contact points of the switches RYS1911-RYS1913 are contacted to the a contact points.

And, at this moment, since the relay RY203 is in a state of the driving, the power supply of 24 V is applied through the switches RYS2034, RYS2112, RYS1912 to the relay RY192 whereby the relay RY192 is driven, and the movable contact points of the switches RYS1921-RYS1924 are contacted to the a contact points. The polarity of the power supply to be applied to the motor M3 of the second arm 4 is changed according to the switching of the switces RYS1921, RYS1922, and the other terminal of the relay RY194 is grounded through the switches RYS1923, TS191 according to the switching of the switch RYS1923 whereby the relay RY194 is driven, and the driving of the timer T192 is stopped according to the switching of the switch RYS1924.

Therefore, the driving of the relay RY194 is stopped and accordingly the movable contact points of the switches RYS1941, RYS1943 are contacted to the a contact points, and both terminals of the motor M3 are contacted together according to the switching of the switches RYS1941, RYS1942, at the same time, the brake MB3 is driven according to the switching of the switch RYS1943 whereby the driving of the second arm 4 is stopped.

In these state, when the first arm 3 is also returned whereby the photo-coupler PC131 is operated, and the transistors TR131, TR132 become ON, and the relay RY131 is driven, and thereby the movable contact point of the switch RYS1311 is contacted to the a contact point, the relay RY155 is driven at the same time, the grounding of the relays RY161, RY171 is cut off whereby the driving of the relays RY161, RY171 are stopped, and thereby the movable contact points of the switches RYS1611-RYS1613, RYS1711-RYS1713 are contacted to the b contact points.

Therefore, the power supply of 12 V is applied through the switches RYS1711, RYS1732 to the timer T161 according to the switching of the switch RYS1711 whereby the timer T161 is driven, and since the other terminal of the relay RY162 is grounded through the switches TS161, RYS1931, RYS1712 during the period of time before the established time of the timer T161 is elapsed whereby the relay RY162 is driven, the driving of the motor M2 of the first arm 3 is stopped, and the brake MB2 is driven, and thereby the driving of the first arm is stopped.

And, when the rotation of the rotational arm 2 is also finished whereby the photo-coupler PC122 is operated, and the transistors TR123, TR124 become ON, and the relay RY122 is driven, and thereby the movable contact point of the switch RYS1221 is contacted to the a contact point, the driving of the relays RY193, RY153, RY156 are stopped. Since the other terminal of the relay RY152 is grounded through the switches TS151, RYS1561 according to the driving stop of the relay RY156 whereby the relay RY152 is driven, the brake MB1 is driven, and the motor M1 is stopped to drive whereby the driving of the rotational arm 2 is stopped, and the polarity of the power supply to be applied to the motor M1 is changed according t the driving stop of the relay RY153.

And, the driving of the relay RY193 is stopped whereby the switch RYS1932 is switched, accordingly the driving of the timer T191 is stopped, and the driving of the relay RY203 is stopped according to the switching of the switch RYS1931, at the same time the relay RY111 is driven whereby the relay RY151 is driven, and then the stand-by operation for moving next product is executed.

On the other hand, in a state of operating as above description, when the over load is loaded in the driving of the rotational arm 2 and the first arm 3, over current is flowed to the motors M1, M2 for driving the rotational arm 2 and the first arm 3, and since the voltage between both ends of the resistors R241, R244 and the variable resistors VR241, VR242 is raised by the over current whereby the output voltage of the bridge diodes BD241, BD242 becomes raised, the photo-couplers PC241, PC242 are operated, and the relays RY241, RY242 are driven and the switches RYS2411, RYS2421 are connected and thereby the driving of the timer T241 is started.

In these state, when the over load is continuously loaded more than the established time of the timer T241, since the switch TS241 is opened, and the driving of the relay RY246 is stopped, the movable contact points of the switches RY246, RYS2462 are contacted to the b contact points. Therefore, since the alternating current AC which has been applied to the transformer T102 is cut off according to the switching of the switch RYS2462, the second rectifier 102 can not output the operational power supply whereby all operation including the motors M1–M3 are stopped, and the over load state is released according to the stopping of the operation and thereby the driving of the relays RY241, RY242 is stopped, while the relay RY246 is driven whereby the movable contact points of the switches RYS2461, RYS2462 are contacted to the a contact points, whereby the second rectifier 102 outputs the operational power supply.

At this moment, in case when the driving of the relay RY246 is stopped as aforementioned due to the over load, since the applying power supply of the timer T242 is cut off and the driving of the timer T242 is stopped thereafter the relay RY246 is driven again and accordingly the power supply is applied to the time T242, the timer T242 starts to be driven again, and since the switch TS242 becomes left in an open state before the established time of the timer T242 is elapsed, the driving of the relay RY244 is stopped, and the movable contact points of the switches RYS2441-RYS2442 are contacted to the b contact points.

Therefore, since the other terminal of the relay RY243 is grounded through the switches RYS2443, RYS2032 according to the switching of the switch RYS2443, the relay RY243 is driven, and since the driving of the relay RY245 is stopped according to the switching of the switch RYS2442, at the same time the other terminals of the relays RY161, RY171 are grounded through the switch RYS2442, the relays RY161, RY171 are driven, and the other terminal of the relay RY243 is grounded through the switches RYS2443, RYS2032 according to the switching of the switch RYS2443 whereby the relay RY243 is driven.

And, the driving of the relay R245 is stopped as above description, accordingly the movable contact points of the switches RYS2451-RYS2453 are contacted to the b contact points. In accordance with the switching of the switch RYS2451, the first arm 3 is returned to the original state and the photo-coupler PC131 is operated, in case when the relay RY131 is driven whereby the movable contact point of the switch RYS1311 is contacted to the a contact point, while the other terminal of the relay RY162 is grounded through the switches RYS2451, RYS1311 whereby it is driven and the driving of the motor M2 is stopped, and thereby the driving of the first arm 3 is stopped. In accordance with the switching of the switch RYS2452, the power supply is applied to the relay RY111 whereby being driven, and in accordance with the switching of the switch RYS2453, the buzzer BZ is driven whereby the over load is warned.

And, the relay RY243 is driven as aforementioned, accordingly the movable contact points of the switches RYS2111, RYS2112 are contacted to the a contact points, at this moment, since the relay RY212 is in a state of the driving stopped, the other terminal of the relay RY211 is grounded through the switches RYS2121, RYS2432 whereby the relay RY211 is driven, and the movable contact points of the switches RYS2111, RYS2112 are contacted to the a contact points. When the driving of the relays RY183, RY184 is stopped according to the switching of the switch RYS2111 whereby the timer T182 is driven, and the established time of the timer T182 is elapsed, the switch TS182 is opened whereby the driving of the relay RY182 is stopped.

Thus, when the driving of the relay RY182 is stopped, the movable contact points of the switches RYS1821, RYS1822 are contacted to the b contact points, and the driving of the brake MB3 is stopped according to the switching of the switch RYS1822, and the driving of the relay RY181 is stopped according to the switching of the switch RYS1821 whereby the movable contact points of the switches RYS1811, RYS1812 are contacted to the b contact points, therefore, the power supply of 25 V is applied through the switches RYS1831, RYS1811, RYS2011 to the motor M3, and the one terminal of the motor M3 is grounded through the switches RYS2012, RYS1812, RYS1832 whereby the motor M3 is driven to the reverse direction, and thereby the second arm 4 is returned to the original state.

Thus, when the returning of the second arm 4 is finished, and photo-coupler PC141 is operated, and the transistors TR141, TR142 become ON, the relay RY212 is driven whereby the movable contact points of the switches RYS2121-RYS2123 are contacted to the a contact points. The driving of the relay RY211 is stopped according to the switching of the switch RYS2121, and the relays RY183, RY184 are driven according to the switching of the switch RYS2123 whereby the movable contact points of the switches RYS1831-RYS1834, RYS1841 are contacted to the a contact points.

Thus, when the relays RY183, RY184 are driven, the power supply is applied to the motor M3 in the opposite direction to the above description according to the switching of the switches RYS1831, RYS1832 whereby the driving of the motor M3 is rapidly stopped, and own contact point is made according to the switching of the switch RYS1834 whereby the relays RY183, RY184 are kept maintained successively with the driving state, and the timer T181 is driven according to the driving of the switch RYS1841.

In these state, when the established time of the timer T181 is elapsed whereby the switch TS181 is connected, the relay RY182 is driven whereby the movable contact points of the switches RYS1821, RYS1822 are contacted to the a contact points, and the brake MB3 is driven according t the switching of the switch RYS1822 whereby the driving of second arm is stopped, and the relay RY181 is driven according to the switching of the switch RYS1821.

In these state, when the established time of the timer T162 which has been driven as above description is elapsed, the switch TS162 is opened, and since the driving of the relay RY162 is stopped whereby the movable contact points of the switches RYS1621-RYS1622 are contacted to the b contact points, the driving of the relay RY162 is stopped, and the driving of the brake MB2 is stopped according to the driving stop of the relay RY162, at the same time the motor M2 is driven and thereby the first arm 3 is returned to the original state.

Thus, the driving of the photo-coupler PC132 is stopped according to the returning to the original state of the first arm 3, and the transistors TR133, TR134 become OFF, the driving of the relay RY132 is stopped whereby the movable contact point of the switch RYS1321 is contacted to the b contact point, therefore the driving of the relay RY163 is stopped. Therefore, the relay RY181 is kept maintained successively with the driving state according to the switching of the switch RYS1632.

In these state, since the returning of the first arm 3 is finished whereby the photo-coupler PC131 is operated, and the transistors TR131, TR132 become ON, and the relay RY131 is driven, and the movable contact point of the switch RYS1311 is contacted to the a contact point, the driving of the relays RY161, RY171 is stopped, and the relay RY162 is driven according to the switching of the relay RY161 whereby the driving of the motor M2 is stopped, and thereby the driving of the first arm 3 is stopped.

And, after the electric power supply is failed in a state of operating the robot and when the alternating current AC power supply is supplied again, since the driving of the timer T242 is started, and the driving of the relay RY244 is stopped during the period of time before the established time of the timer T242 is elapsed, then operating as aforementioned over load time and becoming to the initial state.

As described in detail in above, since the present invention controls the operation of the robot mechanically without using expensive computer system as well as controlling the operation correctly by using the general motor, there are effect that economical burden of user can be decreased because it can be manufactured with relatively lower cost as well as contributing to the industrial automation.

What is claimed is:

1. A driving control circuit for a robot, which robot has a rotational arm, a first arm, a second arm, and a hand to grasp a product, urge the product out of an injection mould, and move the product to a desired location, said circuit comprising:

starting means (110) for outputting starting signals;

rotational arm sensor means (120) for detecting a finishing of rotation of the rotational arm (2) of the robot;

first arm sensor means (130) for detecting a finishing of movement of the first arm of the robot (3);

second arm sensor means (140) for detecting a finishing of movement of the second arm of the robot (4);

first driving means (160) driving the first arm (3) in an operation by the robot in urging the product out of the injection mould, said first driving means (160) driving the first arm (3) according to the signals of said starting means (110) and said first arm sensor means (130);

second driving means (180) driving the second arm (4) in the operation by the robot in urging the product out of an injection mould, said second driving means (180) driving the second arm (4) according to the signals of said starting means (110) and said second arm sensor means (130);

rotational arm driving means (150) for driving the rotational arm (2) in the operation by the robot in urging the product out of the injection mould and in the operation by the robot in moving the product to the desired location, said rotational arm driving means (150) driving the rotational arm (2) according to the signals of said starting means (110) and said rotational arm sensor means (120);

third driving means (170) driving the first arm (3) in the operation by the robot in moving the product to the desired location, said third driving means (170) driving the first arm (3) according to the signals of said starting means (110) and said first arm sensor means (130);

fourth driving means (190) driving the second arm (4) in the operation by the robot in moving the product to the desired location, said fourth driving means (190) driving the second arm (4) according to the signals of said starting means (110) and said second arm sensor means (140);

switching means (200) to selectively operate the robot in urging the product out of the injection mould by the selective operation of said second driving means (180), said switching means (200) selectively operating the robot in moving the product to the desired location by the selective operation of said fourth driving means (190);

second arm sensor switching means (210) for switching a detected signal of said second arm sensor means (140);

detecting means (220) for detecting whether or not the product is grasped within a hand (5) of the robot;

product gripping control means (230) controlling the hand to grasp the product within the injection mould; and power failure/over load detection control means (240) for returning the rotational arm, the first arm, the second arm, and the hand to respective initial positions in the event of power failure and in the event of power overload.

2. The driving control circuit according to claim 1, wherein said third driving means (170) and said fourth driving means (190) include first and second timers (T171 and T191), respectively, whereby said first timer (T171) indicates a first time of delay of said third driving means in driving the first arm, and said second timer (T191) indicates a second time of delay of said fourth driving means in driving the second arm, the delay times indicated on said first and second timers establishing the respective delays of the movements of the first and second arms after said rotational arm driving means (150) ceases to move the product.

3. The driving control circuit according to claim 1, wherein said rotational arm driving means includes a third timer (T151), said third driving means includes a fourth timer (172) and said fourth driving means includes a fifth timer (T192), whereby said third timer indicates a third time of delay of said rotational arm driving means (150) in driving said rotational arm (2), said fourth timer indicates a fourth time of delay of said third driving means (170) in driving said first arm (3), said fifth timer indicates a fifth time of delay of said fourth driving means (170) in driving said second arm (4), the delay times indicated on said third, fourth and fifth timers establishing the respective delay times of the movement of the rotational arm, first arm, and second arm in returning to respective initial positions after finishing moving the product to a desired location.

* * * * *